United States Patent
Ito

(10) Patent No.: US 11,470,865 B2
(45) Date of Patent: Oct. 18, 2022

(54) GLASS NOODLE WITH LOW CROSS-LINKED PEA STARCH

(71) Applicant: ROQUETTE FRERES, Lestrem (FR)

(72) Inventor: Goichi Ito, Tokyo (JP)

(73) Assignee: ROQUETTE FRERES, Lestrem (FR)

( * ) Notice: Subject to any disclaimer, the term of this patent is extended or adjusted under 35 U.S.C. 154(b) by 0 days.

(21) Appl. No.: 16/652,244

(22) PCT Filed: Oct. 1, 2018

(86) PCT No.: PCT/EP2018/076696
§ 371 (c)(1),
(2) Date: Mar. 30, 2020

(87) PCT Pub. No.: WO2019/068662
PCT Pub. Date: Apr. 11, 2019

(65) Prior Publication Data
US 2020/0236979 A1    Jul. 30, 2020

(30) Foreign Application Priority Data

Oct. 3, 2017   (EP) .................................... 17306322

(51) Int. Cl.
*A23L 7/109*      (2016.01)
*A23L 29/219*     (2016.01)
(52) U.S. Cl.
CPC ............. *A23L 7/109* (2016.08); *A23L 29/219* (2016.08); *A23V 2002/00* (2013.01)
(58) Field of Classification Search
CPC ... A23L 29/219; A23L 7/109; A23V 2002/00; A23V 2250/5118
See application file for complete search history.

(56) References Cited

U.S. PATENT DOCUMENTS

| | | | |
|---|---|---|---|
| 4,871,572 A | 10/1989 | Chiu et al. | |
| 4,960,604 A | 10/1990 | Chiu | |
| 5,703,226 A | 12/1997 | Nickel et al. | |
| 5,773,069 A | 6/1998 | Lian et al. | |
| 6,589,585 B1 | 7/2003 | Klingler et al. | |
| 8,512,779 B2 | 8/2013 | Serpelloni | |
| 2008/0233259 A1 | 9/2008 | Imanishi et al. | |

FOREIGN PATENT DOCUMENTS

| | | |
|---|---|---|
| CN | 101091517 A | 12/2007 |
| EP | 1352939 A1 | 10/2003 |
| EP | 2135882 A1 | 12/2009 |
| EP | 2138051 A1 | 12/2009 |
| JP | H05328921 A | 12/1993 |
| JP | 2000093104 A | 4/2000 |
| JP | 2004350559 A | 12/2004 |
| JP | 2012254071 A | 12/2012 |
| JP | 2015002690 A | 1/2015 |
| WO | 2009047013 A2 | 4/2009 |

OTHER PUBLICATIONS

Baljit S. et. al; Studies on the Functional Characteristics of Flour/Starch from Wrinkled Peas (Pisum Sativum); International Journal of Food Properties; (2005) 8:1,35-48 (Year: 2005).*
Shi M, et. al.; Preparation, physicochemical properties, and in vitro digestibility of cross-linked resistant starch from pea starch; Starch; (2013) 65, 947-953 (Year: 2013).*
S Lim and P A Seib, "Preparation and pasting properties of wheat and corn starch phosphates," Cereal Chem. 70(2):137-144 1993 (Year: 1993).*
S Heo "Effect of cross-linking on physicochemical and in vitro digestibility properties of potato starch," Emirates Journal of Food and Agriculture. 2017. 29(6): 463-469 (Year: 2017).*
J Zhao "Level and position of substituents in cross-linked and hydroxypropylated sweet potato starches using nuclear magnetic resonance spectroscopy," Carbohydrate Polymers 131 (2015) 424-431 (Year: 2015).*
G Huo "Twin-screw reactive extrusion for phosphorylation of pea starch with a retained granular identity," Starch 2017, 69, 1700073 (Year: 2017).*
The English translation of the International Search Report, dated Dec. 3, 2018, in the corresponding PCT Appl. No. PCT/EP2018/076696.
Wang Ning et al: "Physicochemical properties of starches from various pea and lentil varieties, and characteristics of their noodles prepared by high temperature extrusion", Food Research International, Elsevier, Amsterdam, NL, vol. 55, Nov. 4, 2013 (Nov. 4, 2013), pp. 119-127, XP028669416.
Ning Wang et al.: "Pea starch noodles: Effect of processing variables on characteristics and optimisation of twin-screw extrusion process", Food Chemistry, Elsevier Ltd, NL, vol. 133, No. 3, Jan. 26, 2012 (Jan. 26, 2012), pp. 742-753, XP028468300.
Kasemsuwan et al., "Preparation of clear noodles with mixtures of tapioca and high-amylose starches," Carbohydrate Polymers 32 (1998), pp. 301-312.
Niu et al., "Effects of Inorganic Phosphates on the Thermodynamic, Pasting, and Asian Noodle-Making Properties of Whole Wheat Flour," Cereal Chemistry 91(1): pp. 1-7, Jan. 2014.
C.-Y. Lii and S.-M Chang entitled "Characterization of Red Bean (Phaseolus radiatus var. Aurea) Starch and Its Noodle Quality", J. Food Science 46, p. 79 (1981).
Northern Pulse Growers Association: "Food Applications of Pea Starch", Northern Crops Institute Jun. 28, 2013 (Jun. 28, 2013), XP002776567, Retrieved from the Internet: URL:http://www.northernpulse.com/uploads%5Cresources%5C908%5C2013-food-applicationsof-pea-starch-npga-%282%29.pdf.
Canadian Grain Commission, "New process to make high-quality starch noodles with Canadian peas developed," retrieved from the Internet: https://www.grainscanada.gc.ca/fact-fait/peas-pois-eng.htm, May 10, 2017.
The English translation of the Colombian Office Action, dated Jan. 18, 2022, in the related Colombian Appl. Mo. NC2020/0003950.
Northern Pulse Growers Association, "Food Applications of Pea Starch," Jun. 28, 2013, retrieved from https://www.northernpulse.com/uploads/resources/908/2013-food-applications-of-pea-starch-npga-(2).pdf.

\* cited by examiner

Primary Examiner — Nikki H. Dees
Assistant Examiner — Jeffrey D Benson

(57) ABSTRACT

The present invention is relative to an extruded oriental noodle, consisting essentially of a starch and water, characterized in that the starch used in the preparation of the noodle is low cross-linked pea starch.

3 Claims, 3 Drawing Sheets

GLASS NOODLE WITH LOW CROSS-LINKED PEA STARCH

CROSS-REFERENCE TO RELATED APPLICATIONS

This application is a National Stage Application of PCT/EP2018/076696 filed Oct. 1, 2018, which claims priority from European Patent Application No. 17306322.3, filed on Oct. 3, 2017. The priority of said PCT and European Patent Application are claimed. Each of the prior mentioned applications is hereby incorporated by reference herein in its entirety.

The present invention provides an oriental noodle consisting essentially of starch and water, wherein the mung bean starch traditionally present in the noodles is replaced by low cross-linked pea starch that confers to the noodle improved cooking resistance.

The present invention relates also to their related process of preparation.

STATE OF THE ART

Starch noodles are an important part of Asian cooking and diet.

Commonly called cellophane or glass noodles, they are known for their glassy, translucent appearance and are used in soups, stir-fries and rolls.

The qualities that customers look for these in starch noodles are a bland taste and short cooking time.

Consumers also prefer noodles that stay firm and non-sticky when cooked.

The traditional choice for making high-quality starch noodles is mung beans, a bean that is native to South Asia, but also grown in places like Australia and India.

The mung bean starch provides unique properties and is the ideal material for noodle manufacture, for example for maintaining the translucency of the glass noodles both before and after cooking.

However, even though starch noodles made from mung beans provide all these qualities, mung bean starch is an expensive choice, as world production of mung beans is limited.

So attempts have been made to replace it with other starches with the necessity to adapt/optimize the process of preparation.

To replace mung bean starch, manufacturers want a more economical choice that can provide the same high quality starch noodles.

One such attempt is reported in an article by C.-Y. Lii and S.-M. Chang entitled "Characterization of Red Bean (*Phaseolus radiatus* var. *Aurea*) Starch and Its Noodle Quality", J. Food Science 46, p. 79 (1981).

It involved the use of red bean starch and more precisely an equal mixture of red bean starch and mung bean starch.

Organoleptic evaluation indicated that the noodles made from the mung bean-red bean starch mixture were similar in texture to the mung bean noodles, but the red bean starch noodles were slightly softer.

Other attempts to replace mung bean starch have included the use of canna, sweet potato, and cassava starches, which have amylose contents of about 27, 26.5, and 22.5% respectively, knowing that mung bean starch has an amylose content of about 33%.

However, noodles prepared from these tuber starches were technologically inferior; they were too soft and their solid losses during cooking were much higher.

Another attempt describes the use of standard potato starch and pea starch, but the texture and the color are not satisfactory.

See for example the document published by the Northern Pulse growers Association (www.northernpulse.com/uploads%5Cresources%5C908%5C2013-food-applications-of-pea-starch-npga-(2).pdf) that shows that potato and pea starches provide less firm texture, slightly shorter cooking time and slightly higher cook loss than those made with mung bean starches, even if pea starch is presented as a good candidate to substitute mung bean starch.

Last, as it seems not possible to totally replace mung bean starch, it was proposed to blend mung bean starch with other starches, like potato starch or pea starch, in order a minima to cut down the cost.

However, it was to the detriment of texture (strong texture . . . ) and color (dark, dull . . . ) after cooking.

Another important aspect concerns the texture of these noodles when served in hot pot, as usually eaten by Asian people.

Similar to other noodles, like wheat flour based noodle, the texture of traditional glass noodles becomes soft rapidly.

Therefore, noodle manufacturers produced thick glass noodles as specialty for serving in hot pot, in order to maintain the texture while eating.

So, improved cooking resistance without changing noodle shape, especially thickness, is a key point of glass noodle market.

An alternative with more economical starches such as pea starch to make starch noodles with acceptable texture was based on the development of new process of manufacturing noodles.

Traditionally, mung bean starch noodles are made using a cylinder-type extrusion process.

The process involves taking mung bean starch and mixing a small portion, such as 5%, with water and cooking it until it gelatinizes.

This gelatinized portion is then added back to the remaining starch and more water is mixed in. Adding this gelatinized portion allows the mixture to form a paste-like consistency that can be put into a cylinder, compressed and extruded through a die to make noodles. The noodles are then cooked in boiling water, cooled in tap water and air-dried.

The new process recommended with pea starch (www.grainscanada.gc.ca/fact-fait/peas-pois-eng.htm) uses high-temperature twin-screw extrusion, a process that is not traditionally used to make noodles, but is commonly used by manufacturers to make cereals, snack foods and soy-based meat alternatives.

However, manufacturers do not all wish to adopt a new method and use new equipment, even if high-temperature twin-screw extrusion could prove a simpler and potentially more economical option for making starch noodles.

They expect new starch, which can replace mung bean starch completely, without changing the process.

To remedy all the encountered difficulties, and more particularly for improving cooking resistance, the solution that is proposed by the present invention is to substitute mung bean starch with a modified pea starch, particularly a low cross-linked pea starch and more particularly a low phosphate reticulated pea starch.

SUMMARY OF THE INVENTION

The invention relates to an extruded oriental noodle, consisting essentially of a starch and water, characterized in that the starch used in the preparation of the noodle is low cross-linked pea starch.

"Essentially" in the present invention means more than 99%.

The noodles so obtained are characterized in that the phosphorus content of the low cross-linked pea starch is between 5 mg to 10 mg per kg of crude starch, and more particularly the low acetylated pea starch shows a gelatinized temperature compared to that of native pea starch increased by about 2° C., (about 2° C. higher).

DETAILED DESCRIPTION OF THE INVENTION

Figure 1:
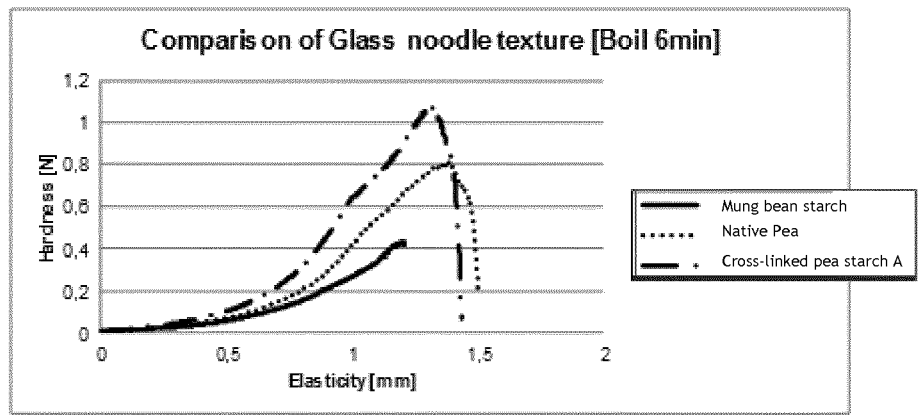
FIG. 1 depicts a comparison of glass noodle texture.

Glass noodle is an "Asian starch based noodle" that is traditionally made with 100% mung bean starch.

As development of food culture, glass noodle manufacturers may change partially the ingredient to pea starch or potato starch, in order to cut down the cost.

They propose "Low price" or "Normal" types glass noodle made with mix of pea starch and mung bean starch besides the Premium Type that contains only mung bean starch.

However, the Applicant has noted that the quality obtained with either the Low price type or the Normal type is far away from that of Premium type.

The following table reflects the texture and cooking resistance obtained.

|  | Low price type | Normal type | Premium type |
| --- | --- | --- | --- |
| Ingredients | Pea starch Mung bean starch | Pea starch Mung bean starch | Mung bean starch |
| Color Product | White | White | White |
| Cooked | Dark and dull | Little dull | Clear and white |
| Texture | Sticky | strong | Low sticky |
| Water uptake |  | Equivalent |  |
| Diameter change | Increase to 145% | Increase to 162% | Increase to 200% |
| Cooking resistance | + | ++ | +++ |

Thus, it is observed that for example on diameter change of noodle string, if all the glass noodles increased their diameter by water uptake, the increasing ratio depends on noodle ingredients.

More particularly, the Premium type shows significantly increased ratio of diameters.

The Low price type shows soft texture, earlier than others in boiling water, and doesn't have enough over cooking resistance, compared with Normal and Premium types.

The Normal type presents less over cooking resistance compared with Premium type.

Thus the glass noodle with pea starch mixed with mung bean starch shows not acceptable textures.

In order to propose new pea starch that can advantageously and economically replace noodles with only mung bean starch, the Applicant carried on numerous experiments to test modified starches, and more particularly cross-linked pea starches.

As native pea starches have poor functional properties such as low shear and acid resistance, low thermal stability and high retrogradation tendency, it is known that modification of pea starches is necessary to tailor-make their specific functional properties, e.g. desirable digestion-resistance, to develop novel functional food ingredients and functional foods.

Cross-linking modifications generally utilize multifunctional reagents to form either ether or ester intermolecular or intramolecular cross-links between the hydroxyl groups on adjacent starch chains. Sodium trimetaphosphate (STMP), sodium tripolyphosphate (STPP), phosphoryl chloride (phosphorus oxychloride: POCl3), epichlorohydrin (EPI), and adipic-acetic mixed anhydride are the common agents employed to produce cross-linked starches.

Optimal reactive conditions and schemes vary according to reagent type.

For reactions with STMP and/or STPP, starch is generally impregnated with both reagent and catalyzing base within an aqueous granule slurry.

The most popularly used food-grade cross-linking reagent for starch is 99:1 (w/w) STMP/STPP owing to its high phosphorylating efficiency.

The phosphorus in modified starch for food use is regulated by the Code of Federal Regulation (CFR, 2001) of the U.S. Food and Drug Administration or by the Directive of the EEC (2000). If STMP/STPP is used to phosphorylate starch for food use, the modified starch cannot contain more than 0.4% phosphorus.

Based on the phosphorus content, the degree of substitution (DS) for phosphate monoester and phosphate diester can be calculated accordingly.

The phosphorus content in cross-linked starched can also be determined by Energy Dispersive X-ray Fluorescence Spectrometry (EDXRF) and Inductively Coupled Plasma-Optical Emission Spectrometry (ICP-OES).

In the present invention, the applicant decided to test various quality of cross-linked starch, with different levels of phosphorylation to substitute with mung bean starch to improve cooking resistance.

The applicant found that to do so, there are two important parameters to take into account:
The content of amylose of this particular starch;
Its gelatinized temperature.

On the first point, as mung bean starch contains 30 to 35% of amylose, pea starch with its 35% of amylose content is the best choice.

On the second point, the Applicant found that the level of modification has to increase the gelatinized temperature of pea starch to improve its cooking resistance, and found that it could be advantageously increased by about 2° C., more advantageously between 1.5° C. and 2.5° C.

To determine this value of about 2 degrees, two cross-linked pea starches were tested:
Cross-linked pea starch "A": a low cross-linked pea starch, produced classically (starch slurry treated with 0.0385% w/w STMP) so that its phosphorus content is 5 mg to 10 mg per kg of crude starch. Its gelatinized temperature is 75.4° C.
Cross-linked pea starch "B": a low cross-linked pea starch, produced classically (starch slurry treated with 0.6% w/w STMP) so that its phosphorus content is 130 mg to 150 mg per kg of crude starch. Its gelatinized temperature is 95° C.

As a comparison, the gelatinized temperature of native pea starch is around 73.4° C. and the gelatinized temperature of mung bean pea starch is around 66.95° C. (values determined by analysis of the standard RVA profiles of these respective starches).

The low cross-linked pea starch useful for the present invention is a pea starch with a phosphorus content below 20 mg per kg of crude starch.

As it will be exemplified after, the range of phosphorus or phosphorus content in the cross-linked pea starch to replace mung bean starch for cooking resistance is more advantageously between 5 to 10 mg per kg of crude starch.

EXAMPLES

This invention will be better understood in light of the following examples which are given for illustrative purposes only and do not intend to limit the scope of the invention, which is defined by the attached claims.

Example 1

Recipe:

|  |  | Mung bean starch | Cross-linked pea starch "A" | Cross-linked pea starch "B" | Native Pea |
|---|---|---|---|---|---|
| Phase A | Mung bean starch | 10 |  |  |  |
|  | Cross-linked pea starch "A" |  | 10 |  |  |
|  | Cross-linked pea starch "B" |  |  | 10 |  |
|  | Native pea starch |  |  |  | 10 |
|  | Water | 15 | 15 | 15 | 15 |
| Phase B | Boiling water | 140 | 140 | 140 | 140 |
| Phase C | Cold water | 30 | 85 | 85 | 60 |
|  | Mung bean starch | 200 |  |  |  |
|  | Acetylated pea starch "A" |  | 200 |  |  |
|  | Acetylated pea starch "B" |  |  | 200 |  |
|  | Native pea starch |  |  |  | 200 |
|  | Total | 395 | 450 | 450 | 450 |

*Water volume was determined, to adjust the dough hardness of these recipes.

Method of Manufacturing Glass Noodle Without Freeze:
Make starch slurry by mix Phase A starch with water,
Add boiling water (140 ml, Phase B) and mix 5 min with hand-mixer (820 rpm),
Add phase C to starch slurry, and mix at 61 rpm for 1 min, then mix at 113 rpm for 10 min,
Pump the dough and extrude through a 2.5 mm in diameter nozzle, and boil 10 sec,
Cool in icy cold water for 5 min,
Air dry at 80° C. for 1 hour.
Cooking and Texture Analysis
boil the noodle in a cup with 500 ml boiling water,
wait for 2 min,
store the noodle in the fridge at 4° C., and check the noodle texture after 1 day, 4 days, 8 days, 12 days and 16 days by using a Texture Analyzer SHIMADZU EZ-SX following the operative guidelines of the manufacturer with the following conditions:
Time: 1
Plunger: tooth shape chip
Speed: 3 mm/min
Sample size: 1 string Results Noodle Texture: Hardness and Softness (See FIG. 1).
The textures of the noodles thus obtained were compared (all having been cooked/boiled during 6 minutes).

It was observed that the glass noodle with Cross-linked pea starch "A" shows harder and stronger texture than that of Mung bean starch, and the glass noodle with native pea starch shows harder and stronger texture than that of Mung bean starch, but less than that of Cross-linked pea starch "A".

It was not possible to obtain glass noodle with Cross-linked pea starch "B" showing that the choice of reticulation level is of utmost importance for this application.

Figure 2:
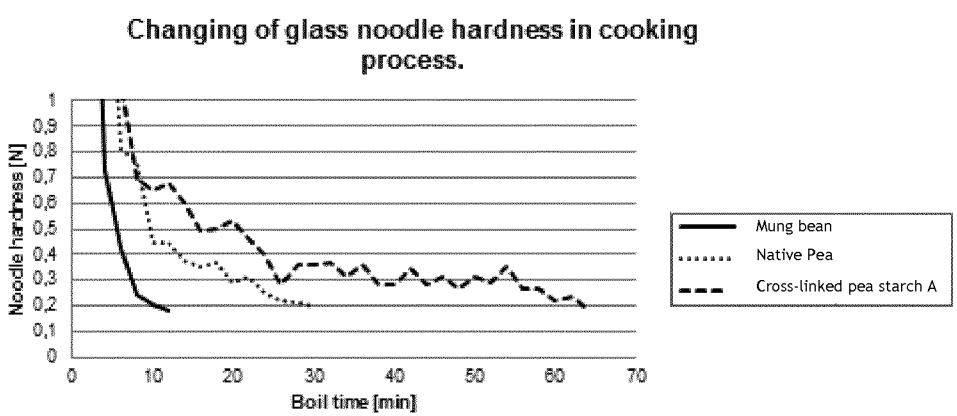
FIG. 2 depicts changing of glass noodle hardness in a cooking process.

Noodle Texture: Cooking Resistance (See FIG. 2).
In order to compare the cooking resistance, peak hardness of cooked glass noodles was plotted every 2 minutes.

In this evaluation, we defined that the noodle hardness which is proper to eat is 0.2-0.7N.

Cross-linked pea starch "A" maintains the proper hardness for a long time (about 9 times longer or more, compared with Mung bean starch), showing its remarkable property.

Figure 3:
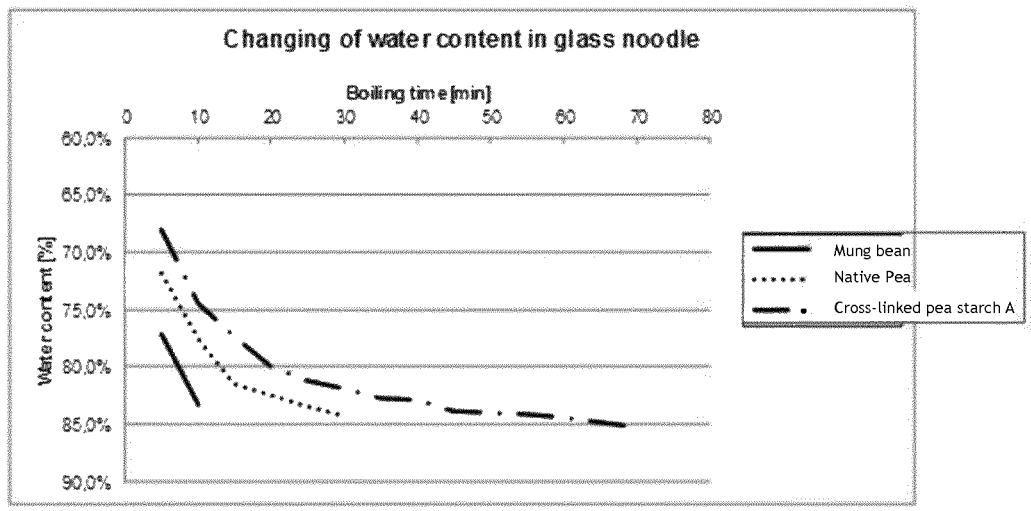
FIG. 3 depicts changing of water content in glass noodles.

Water Absorption:
The water content of each glass noodle in cooking process was also compared (Cf. FIG. 3).

Thus, the glass noodle with Cross-linked pea starch "A" shows slow water absorption, compared with other starches.

Figure 4:
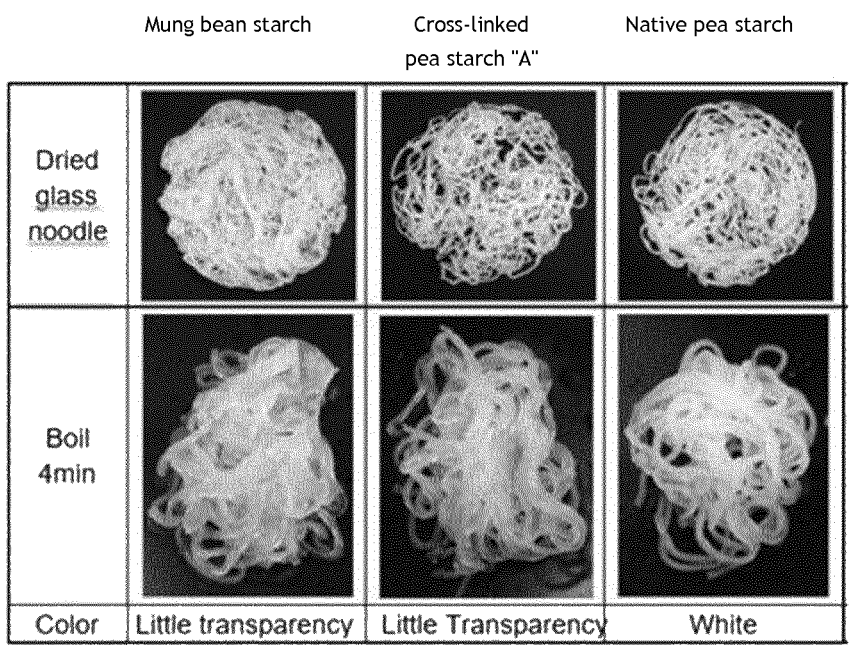
FIG. 4 depicts a comparison of the color of the noodles.

Noodle Color:
The color of the noodles was compared (cf. FIG. 4).
The color of the noodles with Cross-linked pea starch "A" looks like the noodles of Mung bean starch.

It indicates that the replacement of Mung bean with Cross-linked pea starch "A" enables increasd noodle cooking resistance without changing of color.

Example 2

In this example, we compare the performance of Cross-linked pea starch "A" versus mung bean starch.

|  |  | Mung bean starch | Pea | Cross-linked pea starch "A" |
|---|---|---|---|---|
| Phase A | Mung bean starch | 10 |  |  |
|  | Native pea starch |  | 10 | 10 |
|  | Water | 15 | 15 | 15 |
| Phase B | Boiling water | 140 | 140 | 140 |
| Phase C | Cold water | 30 | 60 | 60 |
|  | Mung bean starch | 200 |  |  |
|  | Native pea starch |  | 200 |  |
|  | Cross-linked pea starch "A" |  |  | 200 |
|  | Total | 395 | 425 | 425 |

Figure 5:
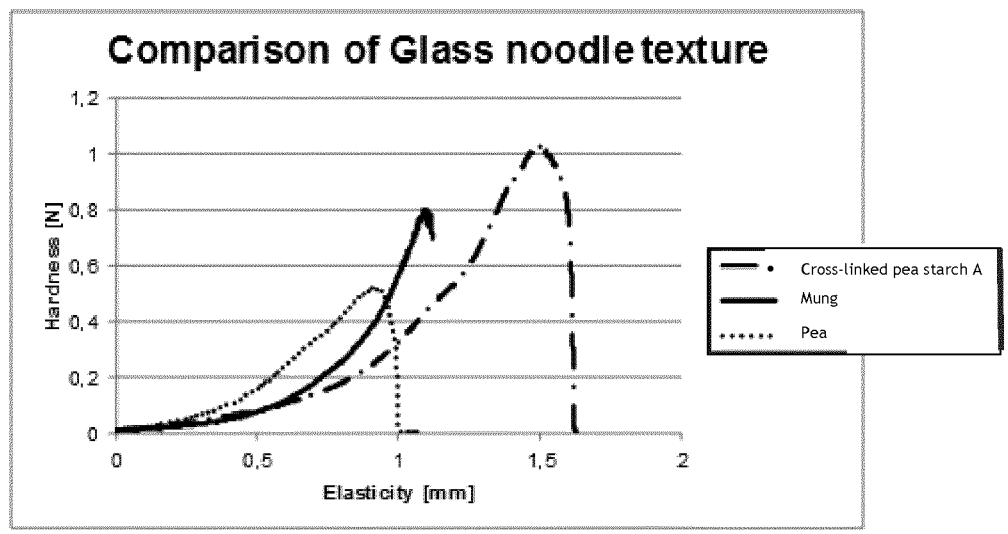
FIG. 5 depicts a comparison of glass noodle texture.

Method of Manufacturing Glass Noodle With Freeze Step:
  Make starch slurry by mix Phase A starch with water,
  Add boiling water (140 ml, Phase B) and mix 5 min with hand-mixer (820 rpm),
  Add phase C to starch slurry, and mix at 61 rpm for 1 min, then mix at 113 rpm for 10 min,
  Pump the dough and extrude through a 2.5 mm in diameter nozzle, and boil 30 sec,
  Cool in icy cold water for 5 min,
  Rinse in water and freeze it at −20° C. for 1 day,
  Thaw a frozen glass noodle by water flow for 30 min,
  Put Into a mold,
  Then air dry at 80° C. for 1 hour.
Cooking and Texture Analysis
  Put glass noodle in a cup, and pour 500 ml of boiled water. wait for 3 min,
  measure the texture by using a Texture Analyzer SHIMADZU EZ-SX following the operative guidelines of the manufacturer with the following conditions:
    Time: 1
    Plunger: tooth shape chip
    Speed: 3 mm/min
    Sample size: 1 string Results Effect of Modification Against Instant Glass Noodle Texture (cf. FIG. 5)

To compare the behavior in term of brittle texture, we evaluate by using method of manufacturing glass noodle with freeze step described previously.

Cross-linked pea starch "A" alters glass noodle texture hardly over mung bean starch, meaning that Cross-linked pea starch "A" confers better cooking resistance properties.

Noodle with native pea starch shows weaker and more brittle texture than Noodle with Mung bean starch. In other words, noodle with native pea starch doesn't have cooking resistance, or weaker than noodle with Mung beans starch. Therefore it confirms the benefit of modification of cross-linking on Pea starch.

The invention claimed is:

1. An extruded oriental noodle, consisting essentially of a starch and water, characterized in that the starch used in the preparation of the noodle is a phosphate reticulated pea starch having a phosphorus content between 5 mg to 10 mg per kg of crude starch.

2. The extruded oriental noodle of claim 1, wherein the gelatinization temperature of the starch used in the preparation of the noodle is 75.4° C.

3. The extruded oriental noodle of claim 1, wherein the gelatinization temperature of the starch used in the preparation of the noodle is between 74.9° C. and 75.9° C.

* * * * *